Patented Dec. 25, 1923.

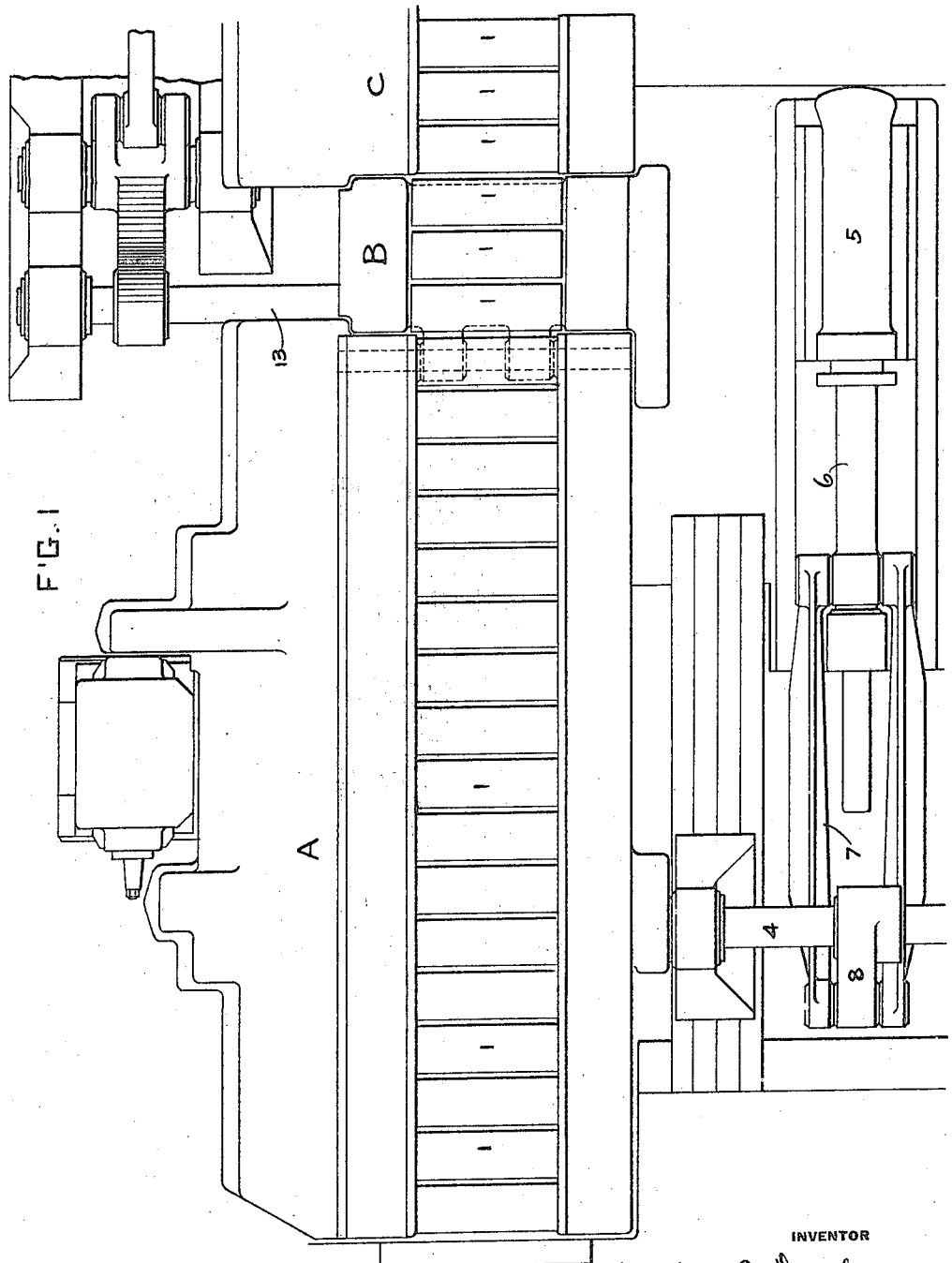

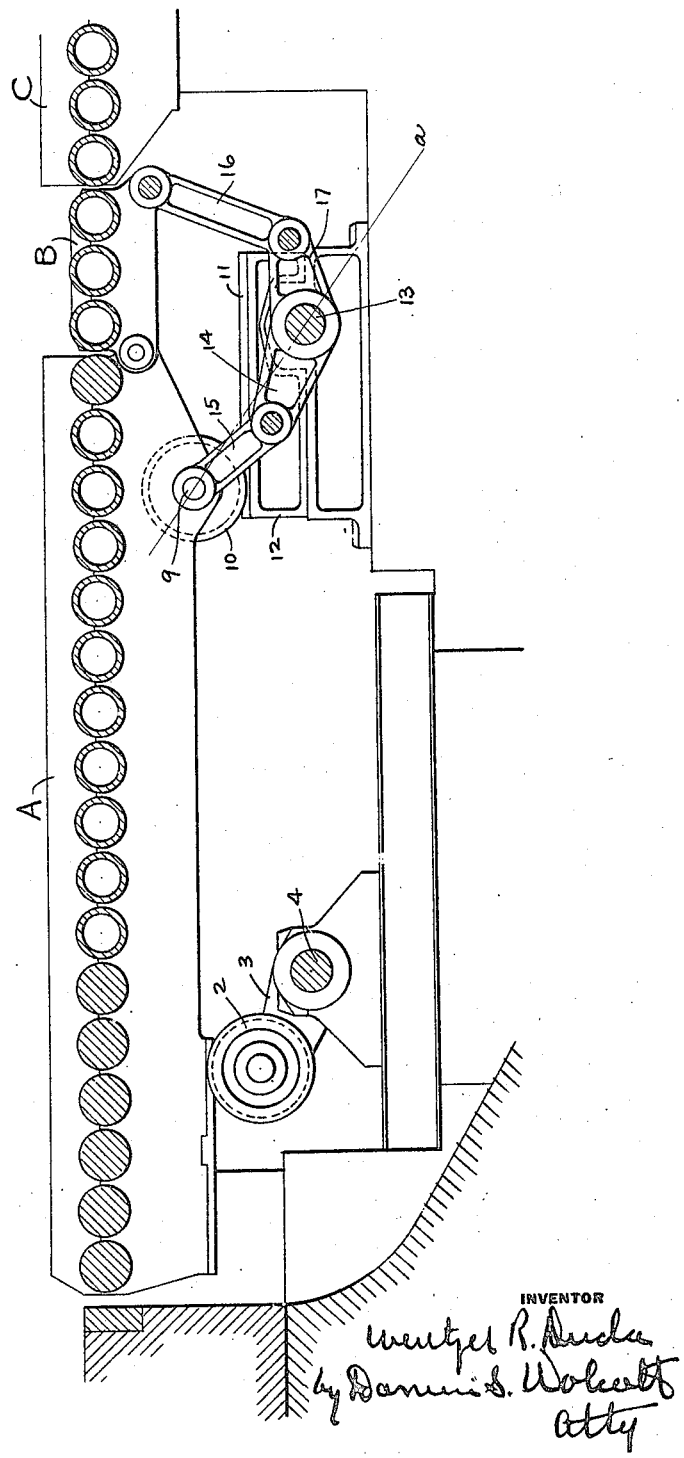

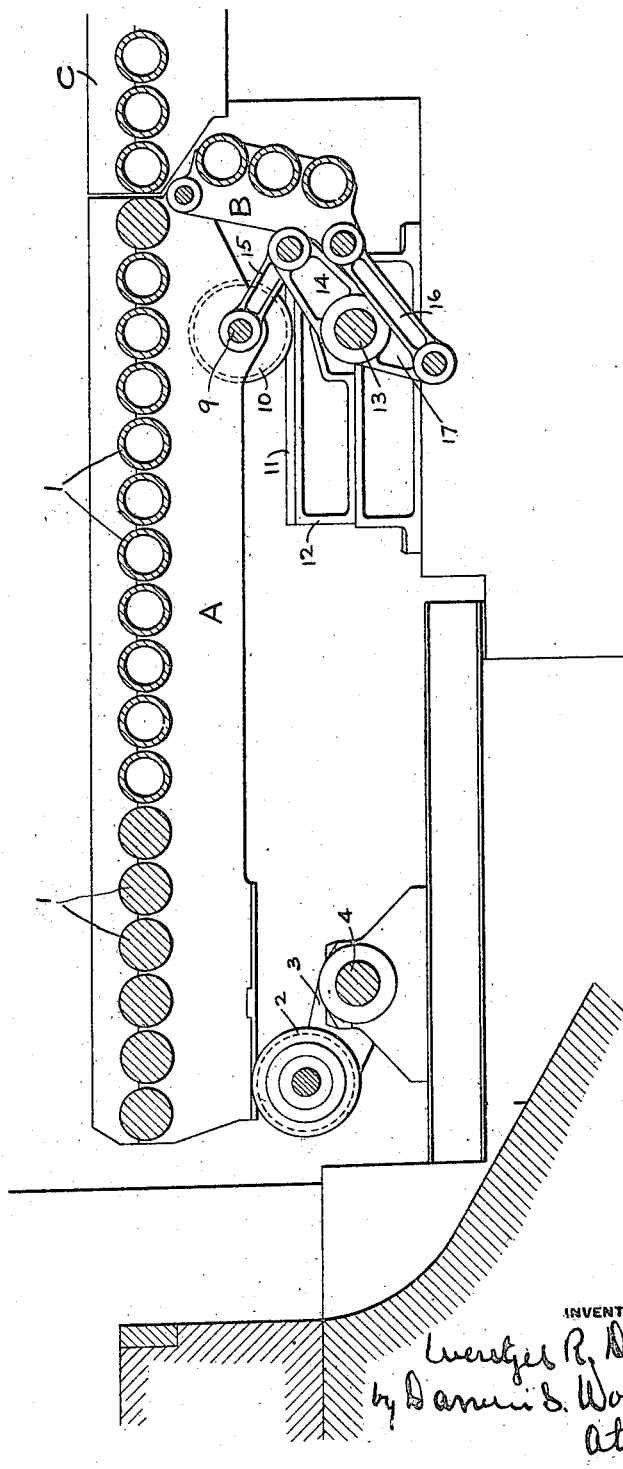

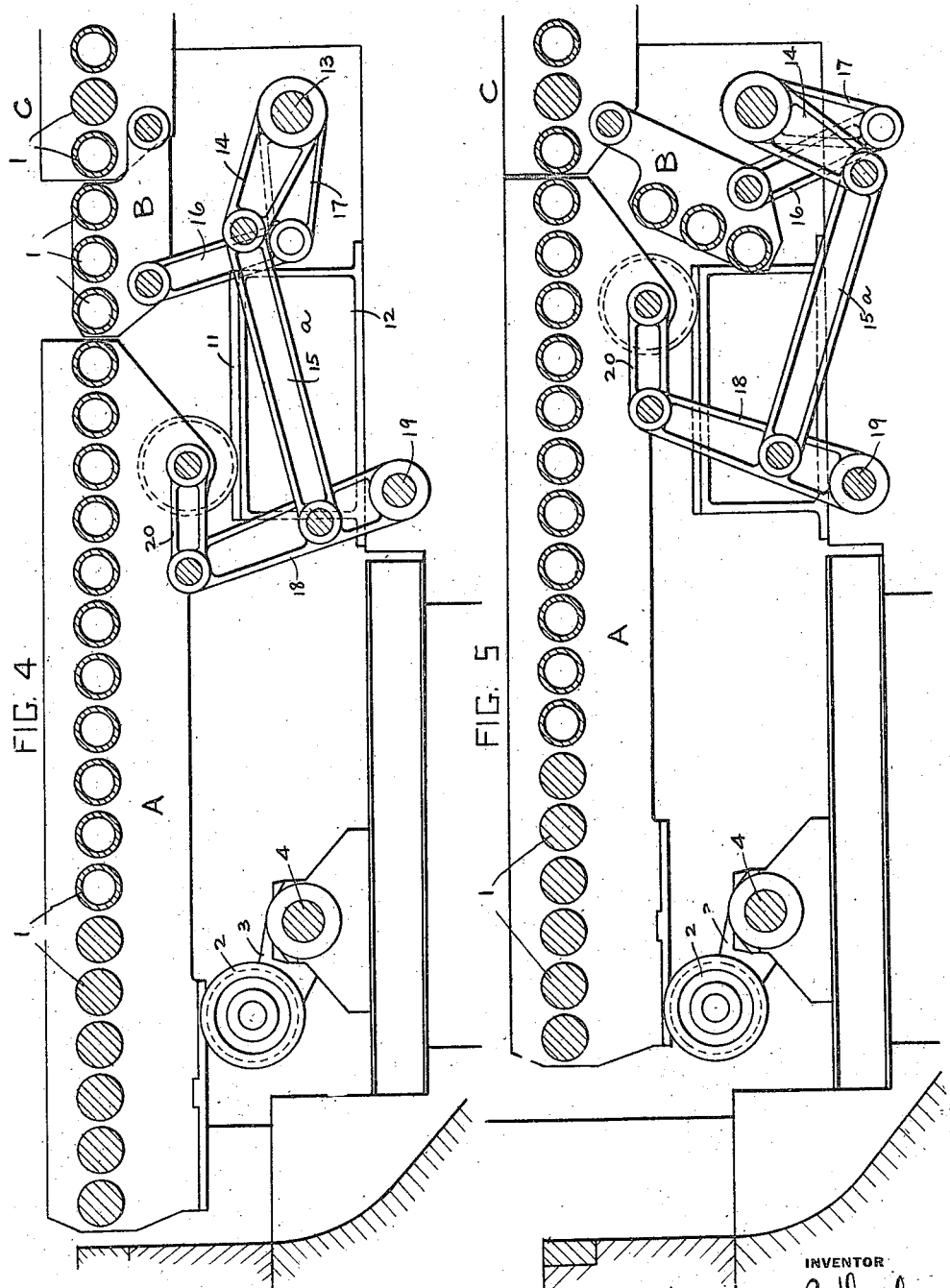

1,478,991

UNITED STATES PATENT OFFICE.

WENTZEL R. DUDA, OF PITTSBURGH, PENNSYLVANIA.

FEED TABLE FOR SHEARING MECHANISM.

Application filed January 16, 1922. Serial No. 529,520.

*To all whom it may concern:*

Be it known that I, WENTZEL R. DUDA, residing at Pittsburgh, in the county of Allegheny and State of Pennsylvania, a citizen of the United States, have invented or discovered certain new and useful Improvements in Feed Tables for Shearing Mechanism, of which improvements the following is a specification.

In order to dispose of crop ends produced in shearing billets, etc., provision is made to shift a portion of the feed table in the rear of the shears in such manner as to form between the shearing blades and the front end of the feed table, a gap or opening into which pieces less than a predetermined length will drop. A construction suitable for that purpose consists in so constructing a portion of the feed table adjacent to the shears as to be capable of longitudinal movement and to provide a section between this movable portion and the fixed or stationary portion of the table, capable of being shifted out of alinement between the movable and stationary portions. In constructions heretofore employed there has always been too great a distance between the end rollers carried by the movable section and the rollers of the adjacent or stationary sections, so that when short lengths were being sheared they would not be moved from one section of the table to the other.

The invention described herein has for its object the construction wherein the spaces between the end rollers carried by the movable section, and the rollers at the adjacent ends of the other sections of the table will be substantially equal to spaces between the rollers of the other sections during the normal operation of shears and table.

In the accompanying drawings forming a part of this specification, Fig. 1 is a top plan view of a shear table embodying the improvement claimed herein; Fig. 2 and Fig. 3 are sectional elevations showing the parts of the table in two positions; and Fig. 4 and Fig. 5 are views similar to Figs. 2 and 3 illustrating a modification.

In the practice of the invention the table is made in three sections, A, B, and C, the sections being provided with feed rollers 1, the rollers of all the sections A, B, and C being preferably driven in any suitable manner. The front end of the section A is supported by flanged wheels 2 carried by rocker arms 3 secured to the shaft 4, which is rotated to raise and lower the arms 3 and the end of section A adjacent to the shears, by any suitable means, as for example, a fluid pressure motor 5 having its ram 6 connected by links 7 to a rocker arm 8 on the shaft 4. The rear end of the section A is carried on the axle 9 of flanged wheels 10 movable along the rails 11 supported by the frame 12. The rear or stationary section C of the table is spaced from the end of the front section a distance substantially equal to the distance which the front section is to be shifted longitudinally to form a gap between the shearing machine and the table for crop ends. The section B which is adapted to be shifted out of and into alinement with the sections A and B is so pivotally connected to the front section A that it can be moved entirely out of the path of movement of the front section. The longitudinal movement of the front section and the pivotal movement of the intermediate section is preferably effected by the shaft 13 which may be rotated by any suitable form or construction of motor.

For effecting the longitudinal movement of the section A, an arm 14 on the shaft 13 is connected to the section by links 15 and for the shifting of the section B the latter is connected by links 16 to arms 17 on the shaft 13. It will be observed that the arm 14 is so arranged that when the parts of the table are in normal position as shown in Fig. 2, the arm is at an angle to a line $a$ passing through the points of connection of the links 15 with the section A and axis of the shaft 13 so that on the initial movement of the shaft to the right in Fig. 2 the table section A will be moved a short distance to the left, thereby affording ample room for the downward movement of the section B. When the shaft is rotated to the left to shift the table sections from the position shown in Fig. 3 to restore the sections to normal position shown in Fig. 2, the arm 14 will while the section B is being raised to position, move beyond the line $a$ and shift the sections A and B to the right closing any gap between sections B and C.

When shifting the sections A and B to provide a gap between the table and the shears, the shaft 4 may be rotated to raise the end of the section A adjacent to the shears, thus preventing all possibility of any crop ends from passing onto the table.

As shown in Figs. 4 and 5 the section B of the table may be pivoted to the stationary section C. In such case the arm 14 on the shaft 13 would be connected by a link 15ª to the arm 18 on a rocking shaft 19 and this arm is in turn connected by a link 20 to the longitudinally movable section A. It will be observed that the arm 14 is arranged on the shaft 13 and the link 15ª is connected to the arm 18 so that when the shaft 13 is turned to the left, the initial movement of the shaft will cause a short movement of the section A to the left to separate the sections A and B sufficiently to permit of the downward movement of the section B, and the continued turning of the shaft 13 to the left will move the section A to the right to close the gap formed by the downward movement of the section B. When restoring the sections of the table to normal position the shaft 13 is turned to the right thereby moving section A to the left. This movement of section A to the left is greater than the length of the section B, but the continued turning of the shaft 13 to the left after section B has been raised to position, will cause the section A to move a short distance to the right.

I claim herein as my invention:

1. A feed table for shears, etc., having in combination longitudinally and vertically movable sections, means for simultaneously moving said sections, said means being adapted to impart a short reverse movement to the longitudinally movable section at the beginning of its movement in one direction and the end of its movement in the opposite direction.

2. A feed table for shears, etc., having in combination stationary and longitudinally movable main sections, said sections being spaced a suitable distance apart, a vertically movable intermediate section pivotally connected to one of the main sections, a rotatable shaft provided with arms connected to said movable sections, said arms being so angularly disposed that by the rotation of the shaft one section will be moved vertically and the other section horizontally.

3. A feed table for shears, etc., having in combination a stationary section, a longitudinally movable section spaced a suitable distance from the stationary section, a vertically movable intermediate section hinged to one of said sections, a rotatable shaft having angularly disposed arms, one of said arms being so connected to the longitudinally movable section that two movements, one the reverse of the other, will be imparted to said section on each rotation of the shaft, and a connection from the other arm on the shaft to the intermediate table section for moving the latter vertically.

4. A feed table for shears having in combination stationary and longitudinally movable main sections, said sections being spaced a suitable distance apart, a vertically movable intermediate section, a rotatable shaft having connections to the longitudinally movable main section and to the intermediate section.

In testimony whereof, I have hereunto set my hand.

WENTZEL R. DUDA.